United States Patent Office 2,737,513
Patented Mar. 6, 1956

2,737,513

MELAMINE SYNTHESIS USING CALCIUM CARBONATE HEAT BUFFER

Johnstone S. Mackay, Pittsburgh, Pa., assignor to American Cyanamid Company, New York, N. Y., a corporation of Maine No Drawing. Application September 16, 1952,
Serial No. 309,950

3 Claims. (Cl. 260—249.7)

The present invention concerns the conversion of dicyandiamide to melamine under ammonia pressure, and more particularly is directed to this conversion in the presence of a calcium carbonate heat buffer at temperatures in the range of about 325°–425° C.

The function and advantages of heat buffers in converting dicyandiamide to melamine are well known to those skilled in the art. The polymerization of dicyandiamide to melamine is highly exothermic, and proceeds almost instantaneously at the melting point of dicyandiamide. It is known that when a solid mass of dicyandiamide is heated to its melting point, as in an autoclave or the like, the material nearest the vessel wall is converted to melamine as soon as it melts, with the release of considerable heat. The heat released then melts more dicyandiamide with further melamine formation. Once initiated, the reaction thus proceeds with increasing rapidity, accelerated by its own exotherm, with the result that the dicyandiamide mass is converted almost instantly, causing the release of so much heat that the local temperatures induced are sufficiently high to decompose as much as half of the resultant melamine into melam and the like. To avoid such decomposition, it has long been known that by conducting the sesquimerization of dicyandiamide to melamine in the presence of an inert diluent, the reaction heat could be absorbed about as fast as it was evolved, thereby largely avoiding local over-heating and consequent melamine decomposition. Aside from the better melamine yield, use of a heat buffer also permits ready removal of the product from the autoclave, as the melamine is formed as a non-adherent, uniform dispersion in the diluent rather than as a monolithic cake fouling the walls and valves of the vessel. Both liquid and solid heat buffers are known to be useful, either at atmospheric pressure or under ammonia pressure. Thus, U. S. Patent 2,203,860 discloses passing dicyandiamide through a rotating furnace maintained at about 300° C., using metal or porcelain balls as the buffer. This idea is extended to conversions under ammonia pressure in U. S. Patent 2,191,361, using iron powder, copper bronze powder, zinc powder, and magnesium oxide as solid buffers. The latter patent also discloses that after calcium cyanamide is converted to dicyandiamide (thereby forming calcium carbonate as a byproduct, in the well known way) these materials could be remixed, and the thus admixed calcium carbonate would serve as a heat buffer. The patent stated that the most favorable temperature range for using heat buffers under ammonia pressure was 120°–200° C., 300° C. being the upper practical limit.

My invention is based on the discovery that when using a heat buffer of calcium carbonate, the best yields of melamine are obtained at temperatures substantially above 300° C., i. e., at least about 325° C., and preferably 350°–400° C.

I have verified the teaching of U. S. Patent 2,191,361 to the effect that the yield of melamine declines on proceeding from 250° to 300° C., using a calcium carbonate buffer with dicyandiamide under ammonia pressure. I have found, however, that as 325° C. is approached, the yield increases once more, and that, beginning at about 325° C., on up to about 425° C., the yield is better than that obtainable at any temperature disclosed in U. S. Patent 2,191,361 as suitable for use with heat buffers.

Aside from the previous understanding of those skilled in the art that heat buffers should not be used in this synthesis at temperatures above 300° C., the high yields obtainable with calcium carbonate are surprising for other reasons. Thus, it is well known that dicyandiamide reacts with carbonates at 350° C. and higher to give cyanates. I have found that the cyanate and similar side reactions do in fact occur while operating above 350° C., but that they have no substantial effect on yield unless the heating period is excessive, or unless the temperature is too high. I have found that above 350° C. dicyandiamide, melamine, or one of the intermediates, begins to react irreversibly with calcium carbonate, to form calcium cyanamide, calcium cyanurate, calcium cyanate, and the like. Within the temperature range of about 350°–400° C. time for which the dicyandiamide-calcium carbonate mixture is held at reaction temperature should not exceed about two hours. Otherwise the yields will be no better than those obtainable below 300° C. (about 78.5%). In the range 400°–425° C. the time at reaction time should not exceed one hour. Inasmuch as the conversion of dicyandiamide to melamine is complete within 5–60 seconds at temperatures above 350° C., heating the "reacted" charge for even a few minutes longer than necessary is undesirable because the additional heat is not only wasted but actually encourages the various side reactions of the melamine product with the heat buffer. Hence, the above noted time limitations above 350° C. are to be considered extreme outside limits for 79%+ yields rather than desiderata. Within the temperature and time limits stated, using an ammonia pressure of at least about 200 p. s. i., dicyandiamide and/or cyanamide intimately admixed with calcium carbonate is converted to melamine in yields of 79–100%, as compared with a maximum yield of about 78.5% at temperatures below 300° C.

The ratio of cyanamide or dicyandiamide to calcium carbonate is not critical, but is suitably about the ratio customarily used for other heat buffers in the synthesis of melamine. Such ratios are well known to those skilled in the art. Thus, in Patent 2,191,361 the weight of dicyandiamide generally does not exceed that of the buffer. When lime nitrogen is converted to "carbonated lime nitrogen" the ratio of dicyandiamide (and/or cyanamide) to inerts (mostly calcium carbonate, with a little graphite) is about 1:3–4.

In preparing the mixture of calcium carbonate and dicyandiamide in accordance with U. S. Patent 2,191,361 for conversion to melamine, various techniques can be used. Thus, the calcium carbonate may be recovered and dried, the resultant aqueous free cyanamide dimerized to dicyandiamide and the latter recovered as the pure dry crystals, followed by mechanical admixing of the two. Actually, however, it is unnecessary to separate the calcium carbonate from the cyanamide solution, since water can be stripped readily from the slurry to provide "carbonated lime nitrogen" as a dry, intimate mixture of cyanamide and/or dicyandiamide and calcium carbonate with minor amounts of inerts, e. g., graphite, silica, etc. In an alternate method, lime nitrogen is simply wetted by spraying it with water and thereafter treating the wet material with carbon dioxide, followed by drying. While the release of free cyanamide using the former method in which the lime nitrogen is slurried in water may be practically quantitative, the latter method involving merely wetting the lime nitrogen avoids the necessity of handling liquids and minimizes the amount of water to be removed in the drying operation. During or after the removal of water, the material may be heated further to convert part or all of the cyanamide to dicyandiamide if desired. Such dimerization is advantageous when using short reaction times in the subsequent conversion to melamine, since free cyanamide has a tendency to volatilize into the ammonia atmosphere, thereby delaying its trimerization. While still other methods of carbonation may be employed, all such "carbonated lime nitrogens" in which a substantial proportion of the calcium cyanamide has been converted to cyanamide, dicyandiamide, or mixtures thereof can be employed in the process of the invention.

This invention can be operated batchwise in an autoclave, or continuously, as in an elongated reactor.

In carrying out the invention is a continuous process, the necessary heat can be supplied through the side walls of the reactor, but it is preferred to preheat the ammonia to be added. This method of heating appears to be more efficient and to facilitate shorter residence times. Once the mass of material has been brought to reaction temperature, the time actually required for effecting the reaction is very short, of the order of seconds, so that the heating problem is mainly in raising the temperature of the material to reaction temperature, rather than in maintaining the charge at the reaction temperature for an extended time.

The melamine produced in accordance with the instant process may be separated from the calcium carbonate residue by various methods. Such methods include extraction of the melamine from the residue with hot water and vaporization of the melamine away from the residue. In employing the former method of separation, it is advisable that the reaction mixture containing the melamine be cooled to a temperature below about 150° C. prior to placing the same in the hot water, in order to minimize hydrolysis.

More than fifteen examples showing the effect of varying reaction temperature, time at reaction temperature, pressure, etc., are summarized in the following table, the appended notes to which provide all working detail necessary to those skilled in the art.

TABLE I

*Formation of melamine from dicyandiamide and/or cyanamide on calcium carbonate at various temperatures and reaction times. (Per cent yield calculated on nitrogen content of charge)*

| Temperature, ° C. | Time heated at reaction temperature | | | | | |
|---|---|---|---|---|---|---|
| | Less than 1 minute | | 1 hour | | 2 hours | |
| | Run No. | Percent Yield | Run No. | Percent Yield | Run No. | Percent Yield |
| 200 | | | 6 | 78.4 | | |
| 250 | 1 | 78.5 | 7 | 77.0 | | |
| 275 | | | 8 | 74.5 | | |
| 300 | 2 | 76.2 | | | | |
| 325 | 3 | 83.3 | | | | |
| 350 | 4 | 100.0 | 9 | 98 | | |
| 360 | | | 10 | 88.2 | | |
| 400 | | | 11 | 79.0 | 14 | 72 |
| 425 | 5 | 84.8 | | | | |
| 450 | | | 12 | 42.0 | 15 | 13.6 |
| 500 | | | 13 | 0 | | |

COMMENTS ON INDIVIDUAL RUNS

*Run No. 1.*—Charge was 100 g. "carbonated lime nitrogen" prepared by passing $CO_2$ gas into a slurry of 30 lbs. lime nitrogen in 18 gal. $H_2O$ at pH of 9, followed by preliminary drying in forced draft at room temperature and final drying at 100° C. for 2 hours. Nitrogen content was 14.2%, present largely as dicyandiamide. Reaction vessel was 300-cc. autoclave. 20 g. $NH_3$ added to charge, giving maximum autogenous pressure of 1,550 p. s. i. About 1 hour required to reach reaction temperature, immediately after which autoclave removed from heater, quenched, and vented. Product was free flowing powder comprising 16.7 g. melamine.

*Run No. 2.*—Substantially same procedure as run No. 1. $NH_3$ pressure was 1,700 p. s. i.

*Run No. 3.*—Continuous run in an elongated spiral coil reactor using total of 2,534 g. "carbonated lime nitrogen" analyzing 13.7% nitrogen largely as dicyandiamide fed at rate of 1,250 g./hr., with $NH_3$ fed at 7,300 g./hr.; $NH_3$ pressure was 250 p. s. i. Residence time about 18 seconds. 346 g. melamine condensed from vapor, 96.7% pure. Residual calcium carbonate heat buffer weighed 2,190 g., contained 66 g. melamine, recovered by hot water extraction.

*Run No. 4.*—Procedure similar to that of run No. 1, using 100 g. of "carbonated lime nitrogen" analyzing 13.2% nitrogen present mostly as dicyandiamide. 20–25 g. $NH_3$ added to give 2,825 p. s. i. pressure. In an identical run at 350° C. and 1,825 p. s. i. pressure the yield was 99+%.

*Run No. 5.*—Continuous run similar to run 3. "Carbonated lime nitrogen" feed rate 3,800 g./hr. $NH_3$ rate 6,600 g./hr. $NH_3$ pressure 250 p. s. i. Residence time 9 seconds. In a similar run at 420° C. and 500 p. s. i. with 19 seconds residence time, yield was also 84.8%.

*Run No. 6.*—Same as run 1. Pressure 1,375 p. s. i.

*Run No. 7.*—Same as run 1 except 2 g. $NH_3$ gave 260 p. s. i. pressure.

*Run No. 8.*—Same as run 1, pressure 1,525 p. s. i.

*Run No. 9.*—Analogous to run 4, using 60 g. "carbonated lime nitrogen" analyzing 12.8% nitrogen. 25 g. added $NH_3$ gave 2,300 p. s. i. pressure. An identical run using 64 g. "carbonated lime nitrogen" and 20 g. $NH_3$ (2,600 p. s. i.) also gave 98% yield.

*Run No. 10.*—The charge consisted of 75 g. pure powdered $CaCO_3$ mixed dry with 21 g. dicyandiamide, heated with 20 g. $NH_3$ in 300-cc. autoclave at 1,500 p. s. i. pressure. At a 370° C. continuous run in the spiral reactor of run 3, using "carbonated lime nitrogen" feed rate of 550 g./hr. and $NH_3$ 3,300 g./hr. (100 p. s. i.), residence time 15 seconds, yield was only 76%, due to low $NH_3$ pressure.

*Run No. 11.*—Analogous to run 1 60 g. "carbonated lime nitrogen" analyzing 12.8% nitrogen heated with 20 g. $NH_3$ (2,600 p. s. i.).

*Run No. 12.*—Analogous to run 1. Pressure 2,900 p. s. i.

*Run No. 13.*—Same as run 12. Pressure 3,050 p. s. i.

*Run No. 14.*—Same as run 11. Pressure 2,800 p. s. i.

*Run No. 15.*—Analogous to run 1. 20 g. $NH_3$ used, giving about 2,850 p. s. i.

While the invention has been described with particular reference to specific embodiments, it is to be understood that it is not to be limited thereto but is to be construed broadly and restricted solely by the scope of the appended claims.

The instant application is a continuation-in-part of my co-pending application Serial No. 81,180, filed March 12, 1949.

I claim:

1. In a method of converting a member of the group consisting of cyanamide and dicyandiamide to melamine in the presence of a calcium carbonate heat buffer under ammonia pressure of at least 200 p. s. i., the improvement which comprises conducting the conversion at a temperature within the range of substantially 325°–425° C. for a reaction time, at the reaction temperature, of from five to about sixty seconds.

2. In a method of converting a member of the group consisting of cyanamide and dicyandiamide to melamine in the presence of a calcium carbonate heat buffer under ammonia pressure of at least 200 p. s. i., the improvement which comprises conducting the conversion at a temperature within the range of substantially 400°–425° C. for a reaction time, at the reaction temperature, of from five to about sixty seconds.

3. The process according to claim 2 in which the reaction time at the reaction temperature is less than twenty seconds.

References Cited in the file of this patent

UNITED STATES PATENTS

| 2,191,361 | Widmer | Feb. 20, 1940 |
| 2,203,860 | Christmann | June 11, 1940 |
| 2,286,349 | Davis | June 16, 1942 |
| 2,545,480 | MacKay | Mar. 20, 1951 |